(12) United States Patent
Wang

(10) Patent No.: US 11,698,189 B2
(45) Date of Patent: Jul. 11, 2023

(54) CATALYST COLUMN AND THERMAL CRACKING SYSTEM

(71) Applicant: Hsiao-Nan Wang, Keelung (TW)

(72) Inventor: Hsiao-Nan Wang, Keelung (TW)

(*) Notice: Subject to any disclaimer, the term of this patent is extended or adjusted under 35 U.S.C. 154(b) by 978 days.

(21) Appl. No.: 16/067,870

(22) PCT Filed: Jan. 6, 2017

(86) PCT No.: PCT/CN2017/070398
§ 371 (c)(1),
(2) Date: Apr. 23, 2020

(87) PCT Pub. No.: WO2017/118404
PCT Pub. Date: Jul. 13, 2017

(65) Prior Publication Data
US 2020/0277530 A1 Sep. 3, 2020

Related U.S. Application Data

(60) Provisional application No. 62/275,420, filed on Jan. 6, 2016.

(51) Int. Cl.
*F23G 5/44* (2006.01)
*F23G 5/027* (2006.01)
(Continued)

(52) U.S. Cl.
CPC .............. *F23G 5/444* (2013.01); *B01J 8/001* (2013.01); *B01J 8/025* (2013.01); *B01J 8/0278* (2013.01); *B01J 8/10* (2013.01); *C01B 3/38* (2013.01); *C10G 1/002* (2013.01); *C10G 1/10* (2013.01); *C10G 5/06* (2013.01); *F23G 5/027* (2013.01); *B01J 2208/00539* (2013.01); *B01J 2208/00884* (2013.01); *B01J 2219/246* (2013.01);
(Continued)

(58) Field of Classification Search
CPC ....... B01J 8/00; B01J 8/001; B01J 8/02; B01J 8/025; B01J 8/0278; B01J 8/10; B01J 2208/00; B01J 2208/00539; B01J 2208/00884; B01J 2219/00; B01J 2219/24; B01J 2219/2444; B01J 2219/246; B01J 19/00; B01J 19/24; C01B 3/38; C01B 2203/0227; C01B 2203/1235; C10G 1/002; C10G 1/10; C10G 5/06; C10G 2300/1003; C10G 2300/1007; F23G 5/444; F23G 5/027; F23G 5/033; F23G 5/46; F23G 5/50; F23G 2205/121
See application file for complete search history.

(56) References Cited

U.S. PATENT DOCUMENTS 3,719,029 A * 3/1973 Suzukawa .............. B01D 53/34
95/211
4,108,682 A * 8/1978 Takeda ..................... B01J 19/30
201/31
(Continued)

*Primary Examiner* — Natasha E Young
(74) *Attorney, Agent, or Firm* — WPAT, PC

(57) ABSTRACT

According to one aspect of the invention, a catalyst tower is provided, which comprises a gas inlet and a catalyst holding plate set therein. The gas inlet is the opening where the catalyst tower and the upstream piping connects with one another. The distance between the gas inlet and the catalyst holding plate is directly proportional to the difference in diameter between the catalyst tower and the upstream piping.

16 Claims, 7 Drawing Sheets

(51) Int. Cl.
  *B01J 8/00*      (2006.01)
  *B01J 8/02*      (2006.01)
  *C01B 3/38*      (2006.01)
  *C10G 1/00*      (2006.01)
  *C10G 1/10*      (2006.01)
  *C10G 5/06*      (2006.01)
  *B01J 8/10*      (2006.01)
  *F23G 5/033*     (2006.01)
  *F23G 5/46*      (2006.01)
  *F23G 5/50*      (2006.01)

(52) U.S. Cl.
  CPC ................. *B01J 2219/2444* (2013.01); *C01B 2203/0227* (2013.01); *C01B 2203/1235* (2013.01); *C10G 2300/1003* (2013.01); *C10G 2300/1007* (2013.01); *F23G 5/033* (2013.01); *F23G 5/46* (2013.01); *F23G 5/50* (2013.01); *F23G 2205/121* (2013.01)

(56) References Cited

U.S. PATENT DOCUMENTS

| | | | | |
|---|---|---|---|---|
| 4,387,652 | A * | 6/1983 | Cooke | B29B 17/04 110/259 |
| 9,175,235 | B2 * | 11/2015 | Kastner | C10L 1/02 |
| 2009/0069450 | A1 * | 3/2009 | Ibsen | B01J 8/005 422/187 |
| 2014/0073822 | A1 * | 3/2014 | Wei | B01J 8/002 422/198 |

* cited by examiner

CATALYST COLUMN AND THERMAL CRACKING SYSTEM

RELATED APPLICATIONS

This application is a national stage filing under section 371 of International Application No. PCT/CN2017/070398, now WO 2017/118404, filed on Jan. 6, 2017, which claims priority to U.S. provisional application No. 62/275,420 filed on Jan. 6, 2016, which are hereby incorporated by reference herein in their entirety.

BACKGROUND OF THE INVENTION

Technical Field

The present invention relates to a thermal cracking system. More particularly, the present invention relates to a thermal cracking system with catalyst tower.

Description of Related Art

In the below description, the meaning of the term "prior technique" is the same as "traditional technique" and is equivalent to the term "prior art", "conventional technology", or "conventional technique", and so on.

Thermal cracking, also known as pyrolysis, has been deemed as a potential alternative way of disposal by the waste management industry. Processing hydrocarbon wastes with a thermal cracking reaction can be beneficial in that (a) it does not generate toxic pollutions as incineration and landfilling do, and (b) it produces valuable commodities such as liquid fuel, combustible gas and carbon black. A major bottleneck in thermal cracking of waste materials has been that the process is usually unable to deliver a desired liquid fuel quality within an acceptable production cycle time. A quality liquid fuel product requires adequate degree of reaction of the waste material. This generally results in a long production cycle which boosts the production cost. Several methods have been tried to solve this problem, whose pros and cons are summarized in Table 1.

TABLE 1

| Prior art | Pros | Cons |
|---|---|---|
| (1) Subjecting premature liquid fuel to secondary treatment such as reactive distillation | Most ensured quality for the liquid fuel product | Highest cost due to extra equipment and long overall production time |
| (2) Modifying the catalyst formulation for thermal cracking reaction | Lowest extra cost | Technically difficult |
| (3) Integrating a catalyst tower into the system to further treatment such as reformation or purification of gas molecules before they are collected as liquid fuel | Successful integration is equivalent to having a built-in reactive distillation with lower cost than method (1). | Technically difficult |

Theoretically, method (3) in Table 1 allows a solution that best balances technical difficulty and the resulting production cost. However, adding the catalyst tower to a thermal cracking process brings its own safety issues. When oil gas produced from the thermal cracking reaction passes the catalyst tower, the packed catalyst allows only a fraction of the gas stream to pass. This slows down the gas flow, thereby causing pressure buildup in the piping upstream of the catalyst tower as a result of oil gas accumulating at the entrance of catalyst bed. Several methods have been tried to combat this problem, but none has been successful, as summarized in Table 2.

TABLE 2

| Prior Art | Problem |
|---|---|
| Using gas extraction means (e.g. vacuum pump) to increase gas flow through the catalyst tower | Costs incurred by extra equipment; safety concerns (e.g. mechanical failure in the extraction means during reaction) |
| Using a relief valve to pass gas to the open air in case of system overpressure. | Frequent release of combustible oil gas may bring environmental as well as safety threats to the neighborhood. |

Another bottleneck facing the commercialization of waste disposal with thermal cracking technology is the frequent maintenance downtime. For a thermal cracking system, when maintenance of individual components is needed, the whole system typically needs to be shut down in light of the risky coexistence of high temperature heat (for providing energy to the reactant) and combustible hot oil gas on site during operation.

Reference is now made to FIG. 1, which is a schematic diagram of a prior art thermal cracking system 100. As shown in FIG. 1, in the thermal cracking system 100, a catalyst tower 102 is set between a reactor 101 and a condenser assembly 103 which comprises sub-condensers 103A, 103B, and 103C working in series. A thermal cracking reaction takes place inside the reactor 101 and produces oil gas. Oil gas from the reactor 101 enters the catalyst tower 102 and passes through a packed catalyst bed 105 where it gets reformed with the aid of catalyst in the catalyst bed 105. The reformed oil gas then leaves for the sub-condensers 103A, 103B, and 103C, where it gets condensed into a liquid fuel. The liquid fuel is then collected and stored in a storage vessel 106. The catalyst bed 105 is held on a catalyst holding plate 104. The catalyst holding plate 104 comprises a plurality of openings set thereon for oil gas to pass through. The catalyst tower 102 is typically tall and thin in shape.

The black arrow in FIG. 1 depicts the piping network in the thermal cracking system 100. As shown, the piping comprises three portions, with the first portion being between the reactor 101 and the catalyst tower 102, the second portion being between the catalyst tower 102 and the condenser assembly 103 (including those being between individual sub-condenser 103A, 103B and 103C), and the third portion being between the condenser assembly 103 and the storage vessel 106. For convenience, the piping connecting the reactor 101 to the catalyst tower 102 will be referred to as the pre-catalyst tower piping, and that connecting the catalyst tower 102 to the condenser assembly 103 will be referred to as the post-catalyst tower piping hereinafter, respectively.

The white arrows in the catalyst tower 102, on the other hand, represents the direction of gas flow inside the catalyst tower 102.

It should be noted that individual components of thermal cracking system 100 are not depicted in actual relations to one another in terms of size. For example, the catalyst tower 102 is not typically larger than the reactor 101. Also, the piping in FIG. 1 is represented by a thin line, but as will be appreciated by those skilled in the art, the thickness of the line does not imply the pipe size relative to other components of the thermal cracking system 100, such as the reactor 101, the catalyst tower 102 or the condenser 103, in real practice.

It should also be noted that the pre-catalyst tower piping in FIG. 1 is depicted to connect to the catalyst tower 102 from the side, but it is also a common practice that the connection is made at the bottom of the catalyst tower 102.

SUMMARY

The present invention provides a catalyst tower which comprises a pressure buffer which is set upstream of the packed catalyst bed. The pressure buffer exploits one of the behaviors of a gaseous matter that the pressure it exerts typically drops when it expands in volume. The present invention also provides a thermal cracking system which implements this self-pressure buffering catalyst tower. The present invention enhances operational safety for the thermal cracking process.

According to one aspect of the invention, a thermal cracking system is provided, which comprises a reactor, a catalyst tower, a condenser, a set of pre-catalyst tower piping, and a set of post-catalyst tower piping. A catalyst holding plate is set in the catalyst tower. One end of the pre-catalyst tower piping is connected to the catalyst tower, while the other end to the reactor. One end of the post-catalyst tower piping is connected to the catalyst tower, while the other end to the condenser. The distance between a gas inlet of the catalyst tower and the catalyst holding plate is directly proportional to the diameter difference between the catalyst tower and a portion of the pre-catalyst tower piping which is in direct connection with the catalyst tower.

According to another aspect of the invention, a catalyst tower is provided, which comprises a gas inlet and a catalyst holding plate set therein. The gas inlet is the opening where the catalyst tower and the upstream piping connects with one another. The distance between the gas inlet and the catalyst holding plate is directly proportional to the difference in diameter between the catalyst tower and the upstream piping.

According to another aspect of the invention, a thermal cracking system is provided, which comprises a reactor assembly comprising at least two sub-reactors, a catalyst tower, a condenser, at least two sets of pre-catalyst tower piping, and a set of post-catalyst tower piping. For each set of the pre-catalyst tower piping, one end thereof is connected to the catalyst tower, and the other end is connected to one corresponding sub-reactor. On the other hand, one end of the post-catalyst tower piping is connected to the catalyst tower, and the other end to the condenser.

According to another aspect of the invention, a thermal cracking system is provided which comprises a reactor, a catalyst tower assembly comprising at least two sub-catalyst towers, a condenser, at least two sets of pre-catalyst tower piping, and at least two sets of post-catalyst tower piping. Each sub-catalyst tower is connected to one corresponding set of pre-catalyst piping at one end, and one corresponding set of post-catalyst piping at the other end. The pre-catalyst and post-catalyst tower piping are connected to the reactor and the condenser at the other end, respectively.

According to another aspect of the invention, a thermal cracking system is provided, which comprises a reactor, a catalyst tower, a condenser assembly comprising at least two sub-condensers, a set of pre-catalyst tower piping, and at least two sets of post-catalyst tower piping. The pre-catalyst tower piping is connected to the catalyst tower at one end and the reactor at the other end. For each set of the post-catalyst tower piping, one end thereof is connected to the catalyst tower, and the other end is connected to one corresponding sub-condenser.

BRIEF DESCRIPTION OF DRAWINGS

The invention can be more fully understood by reading the following detailed description of the embodiment, with reference made to the accompanying drawings as follows.

DETAILED DESCRIPTION

Figure 1:
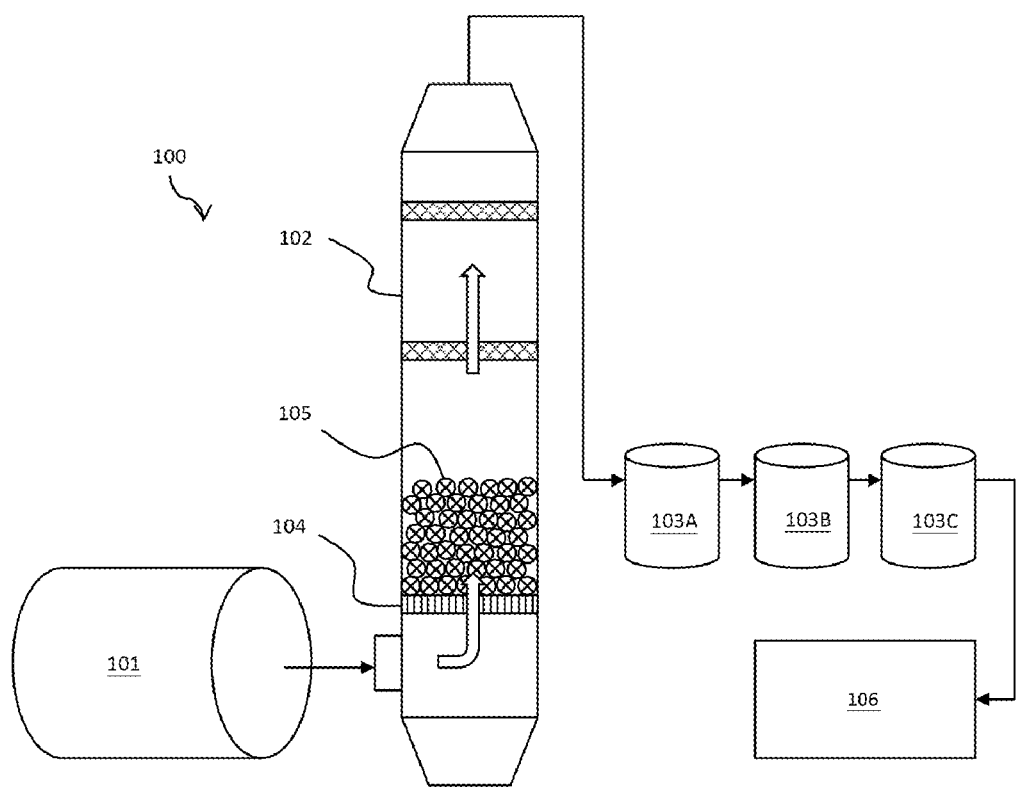
FIG. 1 is a schematic diagram of a prior art thermal cracking system.

The technical means adopted in the present invention for achieving intended purposes of the invention are further described below with accompanying drawings and specific embodiments. Those skilled in the related art can understand that the directional terms provided in the specific embodiments, such as up, down, left, right, front, or back etc., are used for elaboration with reference to the directions of the drawings only, but are not intended to limit the present invention. In addition, many variations and modifications can be made by those skilled in the related art without departing from the spirit and scope of the invention, and the practical examples derived therefrom are also within the scope of the invention.

The inventor has observed that for most prior art catalyst towers implemented in thermal cracking-based waste disposal processes, the problem of upstream pressure buildup results from a relatively small cross-sectional area selected for the catalyst tower. Rather than being designed from scratch, most conventional catalyst towers used in the thermal cracking of wastes are nothing more than a direct transplant from the designs used in the petrochemical industry where the catalyst tower has been deemed as a "mature" technology. This saves the R&D costs, but also introduces side effects. The petrochemical industry typically is able to afford high-level pressure equipment which is a luxury the waste management industry in general does not have. Further, the chemical nature of both processes is different. For example, in thermal cracking of wastes, the composition and condition of feedstock is usually not well controlled. The reaction behavior thus varies from batch to batch, causing wide-ranging fluctuations in operating conditions including the system pressure. These fluctuations should be addressed by the design either on a component level or for the system as a whole. The catalyst tower is one of those components that should be designed with these factors in mind.

The inventor has discovered that one potential solution to the problem of upstream pressure buildup is to employ an increased cross-sectional area (i.e. an increased diameter) for the catalyst tower, so that the incoming oil gas, once inside the catalyst tower, expands in volume thereby rendering a decrease in its pressure. However, when a gas expands in volume, its temperature tends to drop, which may lead to premature condensation of the oil gas inside the catalyst tower, thereby hurting the system throughput. Further, a large catalyst tower usually means higher capital and operational costs. Therefore, a balance must be found between the effectiveness of the system design in pressure buffering and system economics.

Theoretical as well as empirical findings from the inventor that form the foundation of the present invention are described as follows.

In general, a catalyst tower of a smaller diameter has a holding plate with smaller area. When the same amount of catalyst is put on a smaller holding plate, a higher packed bed is resulted. This means more time is needed for the gas to pass through the bed, which is favorable for the occurrence of upstream pressure buildup. Therefore, a greater diameter may be used for the catalyst tower to lower the height of packed bed when the same amount of catalyst is used, and thereby help to combat the upstream pressure buildup.

An elevated location of the holding plate in the catalyst tower also helps in buffering upstream pressure, as it allows more space for the incoming gas to expand into.

Therefore, a thermal cracking system is provided. The system includes a reactor, a catalyst tower, and a condenser. A catalyst holding plate is set in the catalyst tower. A pre-catalyst tower piping connects the catalyst tower and the reactor, and a post-catalyst tower piping connects the catalyst tower and the condenser. The distance between a gas inlet of the catalyst tower and the catalyst holding plate is directly proportional to the diameter difference between the catalyst tower and a portion of the pre-catalyst tower piping which is in direct connection with the catalyst tower.

The diameter of catalyst tower in the prior art thermal cracking systems used for waste disposal is typically larger than that of the pre-catalyst tower piping, for example, mostly between 2 to 4 times of the diameter of pre-catalyst tower piping. Such diameter difference allows the incoming gas to expand to a certain degree when it enters the catalyst tower, but in general is not enabling sufficient expansion of gas to overcome the pressure buildup.

It should be noted that, the diameter may not be constant throughout the entire catalyst tower. For example, as shown in FIG. 1, the catalyst tower 102 contracts in cross-sectional area toward the end. For convenience, the diameter of a catalyst tower will be referred to hereinafter as the one belonging to a portion of the catalyst tower that accounts for the most of its body. Similarly, the diameter of the pre-catalyst tower piping may not be constant. For example, the end of the pre-catalyst tower piping connected with the reactor may be of one diameter, while the other end connected with the catalyst tower be of another. Thus, for convenience, the diameter of the pre-catalyst tower piping will be referred to hereinafter as the one of the opening where the pre-catalyst piping and the catalyst tower connects with each other, i.e. the gas inlet of the catalyst tower.

Figure 2A:
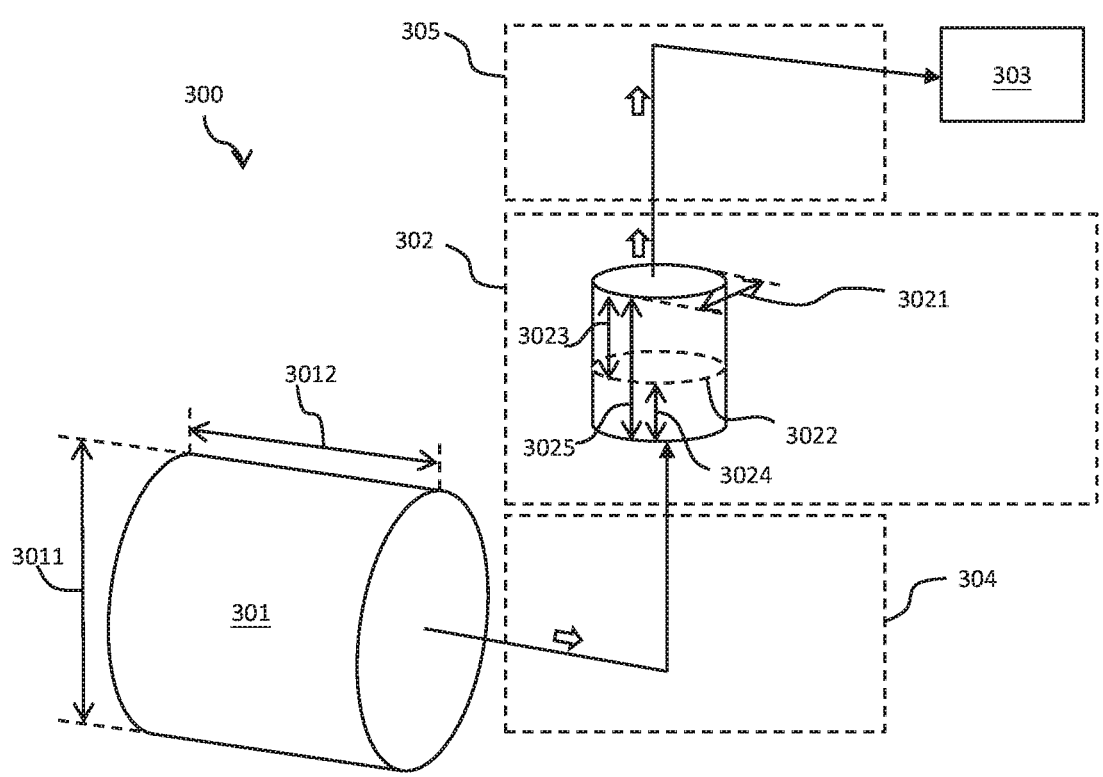
FIG. 2A is a schematic diagram of a thermal cracking system according to one embodiment of the invention.
Figure 2B:
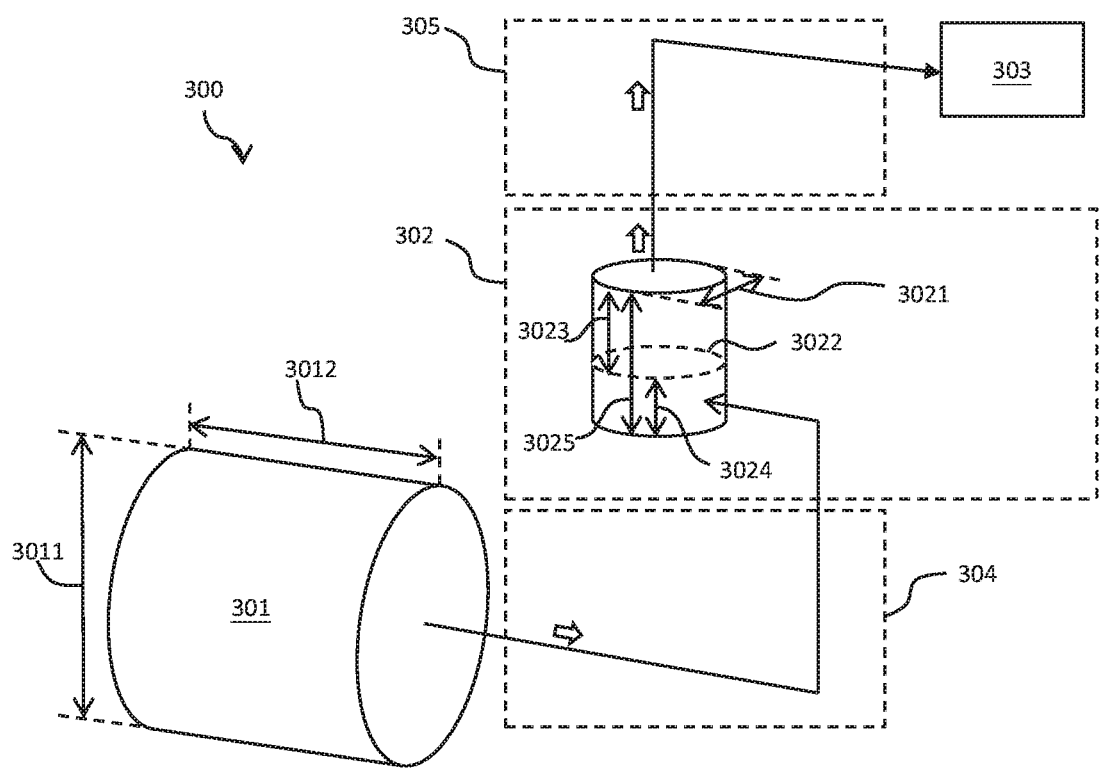
FIG. 2B is a schematic diagram of a thermal cracking system according to another embodiment of the invention.

Other observations made by the inventor are described in Table 3 in conjunction with FIGS. 2A and 2B Reference is now made to FIG. 2A and FIG. 2B, wherein FIG. 2A is a schematic diagram of a thermal cracking system 300 according to one embodiment of the invention, and FIG. 2B is a schematic of a thermal cracking system 309 according to another embodiment of the invention. It can be seen from FIG. 2A and FIG. 2B that the only difference between thermal cracking system 300 and 309 is the location of the connection point of the pre-catalyst tower piping (304) to the catalyst tower (302). In thermal cracking system 300 in FIG. 2A, the connection is made at the bottom of the catalyst tower 302, while in thermal cracking system 309, the connection is made to the side of the catalyst tower 302. It should be noted that, as can be appreciated by those skilled in the art, the pre-catalyst tower piping 304 may also be connected to the catalyst tower 302 at both locations at the same time without deviating from the concept of the invention.

As shown, both thermal cracking system 300 and 309 comprise a reactor 301, a catalyst tower 302, a condenser 303, a set of pre-catalyst tower piping 304 with one end connected to the reactor 302 and the other end to the catalyst tower 302, and a set of post-catalyst tower piping 305 with one end connected to the catalyst tower 302 and the other end to the condenser 305.

The reactor 301 has a diameter 3011 and a length 3012. The catalyst tower 302 has a diameter 3021 and a height 3025. A catalyst holding plate 3022 is set in the catalyst tower 302, wherein the diameter of the catalyst holding plate 3022 is substantially equal to that of the catalyst tower 302. The catalyst holding plate 3022 is apart from the top of the catalyst tower 302 by a distance 3023, and is apart from the connection point of the pre-catalyst tower piping 304 to the catalyst tower 302 by a distance 3024. In other words, the height 3025 of the catalyst tower 302 is substantially the sum of distance 3023 and 3024.

TABLE 3

| Design Parameter | Inventor's Findings |
|---|---|
| 1. Capacity of reactor 301 | The larger capacity of reactor 301, the greater rate at which gas is generated therefrom. Thus, a larger capacity for catalyst tower 302 is needed to ensure sufficient pressure buffer. |
| 2. Capacity of catalyst tower 302 | A large catalyst tower capacity generally provides more space for gas to expand into, thereby allowing greater buffering effect. However, the cost of catalyst tower 302 increases exponentially with its size. Further, excessive expansion may lead to premature condensation of gas due to the dropping temperature of gas at expansion. For example, for gas with certain compositions, condensation occurs when its temperature drops below 250° C. This could hurt the system yield. |
| 3. Diameter 3021 of catalyst tower 302 | A larger catalyst tower diameter 3021 generally results in more space for gas to expand into, thereby allowing greater buffering effect. However, when diameter 3021 increases, the height 3025 of catalyst tower also needs to increase (see point 4), resulting in a higher cost as described in point 2 above. |
| 4. 3024 vs. 3021 | The larger diameter of catalyst tower 3021, the longer distance 3024 should be used for enabling gas to fully expand prior to |

TABLE 3-continued

| Design Parameter | Inventor's Findings |
|---|---|
| | reaching the holding plate 3022, so that it gets to contact the catalyst at the center as well as the outer portion of holding plate 3022. This ensures all catalyst in the packed bed is made use of, thereby contributing to the system economics. A tradeoff exists though, that the catalyst tower height 3025 increases with an increasing distance 3024, resulting in a larger catalyst tower 302 thus a higher cost as described in point 2. |

TABLE 4

| Temperature of reactor 301 | 3021 (m) | 3024/3021 | Capacity of catalyst tower 302 ($m^3$) | Pressure at the gas inlet (MPa) |
|---|---|---|---|---|
| 300~360° C. | 2.8 | 2.8/2.8 = 1 | 23.70 | <0.01 |
| 300~360° C. | 2.52 | 2.52/2.8 = 0.9 | 17.28 | <0.01 |
| 300~360° C. | 2.1 | 2.1/2.8 = 0.75 | 13.33 | <0.01 |
| 300~360° C. | 1.8 | 1.8/2.8 = 0.64 | 6.30 | <0.01 |
| 300~360° C. | 1.6 | 1.6/2.8 = 0.57 | 4.42 | <0.01 |
| 300~360° C. | 1.4 | 1.4/2.8 = 0.5 | 2.96 | <0.01 |
| 300~360° C. | 1.2 | 1.2/2.8 = 0.43 | 1.87 | <0.01 |
| 300~360° C. | 0.93 | 0.93/2.8 = 0.33 | 0.88 | <0.01 |
| 300~360° C. | 0.8 | 0.8/2.8 = 0.29 | 0.55 | >0.01 |
| 300~360° C. | 0.7 | 0.7/2.8 = 0.25 | 0.37 | >0.01 |

Based on these observations, catalyst towers embodying the principles of the invention are provided with the objective of rendering a balance between the effectiveness of system in pressure buffering and system economics in mind. These embodiments and implementation thereof in thermal cracking systems are described as below.

In one embodiment of the invention, the diameter 3021 of the catalyst tower 302 is a function of that of the pre-catalyst tower piping 304. As mentioned above, the diameter difference between the catalyst tower 302 and pre-catalyst tower piping 305 is generally not large enough to enable sufficient expansion of gas to overcome the pressure buildup. In one preferred example of this embodiment, the diameter 3021 of catalyst tower is equal to or greater than 4.5 times that of the pre-catalyst tower piping 304. For instance, a diameter of 8 inches (approx. 0.2 meters) is one of the common pipe sizes used for pre-catalyst tower piping 304 in the prior art thermal cracking systems for waste disposal. In such case, the catalyst tower according to this embodiment comprises a diameter equal to or greater than 9 meters.

In one embodiment of the invention, the diameter 3021 of the catalyst tower 302 is determined based upon a predetermined ratio of the capacity of catalyst tower 302 to reactor 301. The general rule is that the ratio of diameter of catalyst tower 302 to reactor 301 (i.e. 3021/3011) increases with a decreasing ratio of capacity of catalyst tower 302 to reactor 301. In other words, the more the reactor 301 oversizes the catalyst tower 302 in capacity, the larger diameter is employed for the catalyst tower 302.

In one example of this embodiment, the capacity of catalyst tower 302 is selected to be 0.07~0.13 (1/15~1/8) that of reactor 301. And this may be optionally implemented together with a corresponding value of 3021/3011 being 1~0.33 (1~1/3). More preferably, the capacity of catalyst tower is selected to be 0.09~0.11 (1/11 to 1/9) that of reactor 301, which may also be optionally implemented together with a corresponding value of 3021/3011 being 1~0.5 (1~1/2).

In one embodiment of the invention, the reactor 301 is a rotary kiln reactor with a diameter of 2.8 meters and a length of 6.6 meters (resulting a capacity of approximately 40 cubic meters). The feedstock is selected from one of the following, or combinations thereof: plastics, tire and waste oils. The reactor 301 is selected to operate between room temperature and 420° C. A matrix of design parameter combinations and associated findings are presented in Table 4. Parameters investigated include reactor temperature, diameter 3021 of catalyst tower 302, ratio of 3024 to 3021 (i.e. 3024/3021) and the capacity of catalyst tower 302.

As shown in Table. 4, with the tried parameter combinations, the pressure at gas inlet of the catalyst tower 302 (which substantially equals to the pressure in the pre-catalyst tower piping 304) is below 0.01 Mpa except for the last two data sets where 3021 is less than 1/3 of the reactor diameter.

As mentioned in point 4 of Table 3, a longer distance 3024 should be employed for catalyst tower 302 in the case of a larger diameter 3021 thereof. This can be seen from Table 4, where the pressure at gas inlet is consistently kept low when the value of 3024/3021 is selected to increase with an increasing 3021. A few embodiments of the invention are therefore developed based upon the design parameter of 3024/3021. In one embodiment, the value of 3024/3021 is equal to or greater than 0.4. More preferably, the value of 3024/3021 is equal to or greater than 0.5. This design parameter can also be implemented together with other design parameters to provide a method for use in designing the overall system. For example, in one embodiment, a thermal cracking system is provided, which comprises a reactor, a catalyst tower with a catalyst holding plate set therein, and a condenser. The system further comprises a set of pre-catalyst tower piping and a set of post-catalyst tower piping, where one end of the pre-catalyst tower piping is connected to the reactor and the other end to the catalyst tower, while one end of the post-catalyst tower piping is connected to the catalyst tower and the other end to the condenser. The thermal cracking system is characterized in that the distance between the holding plate and the connection point of the pre-catalyst tower piping to the catalyst tower (i.e. 3024) is directly proportional to the difference in diameter between the pre-catalyst tower piping and the catalyst tower.

Figure 3A:
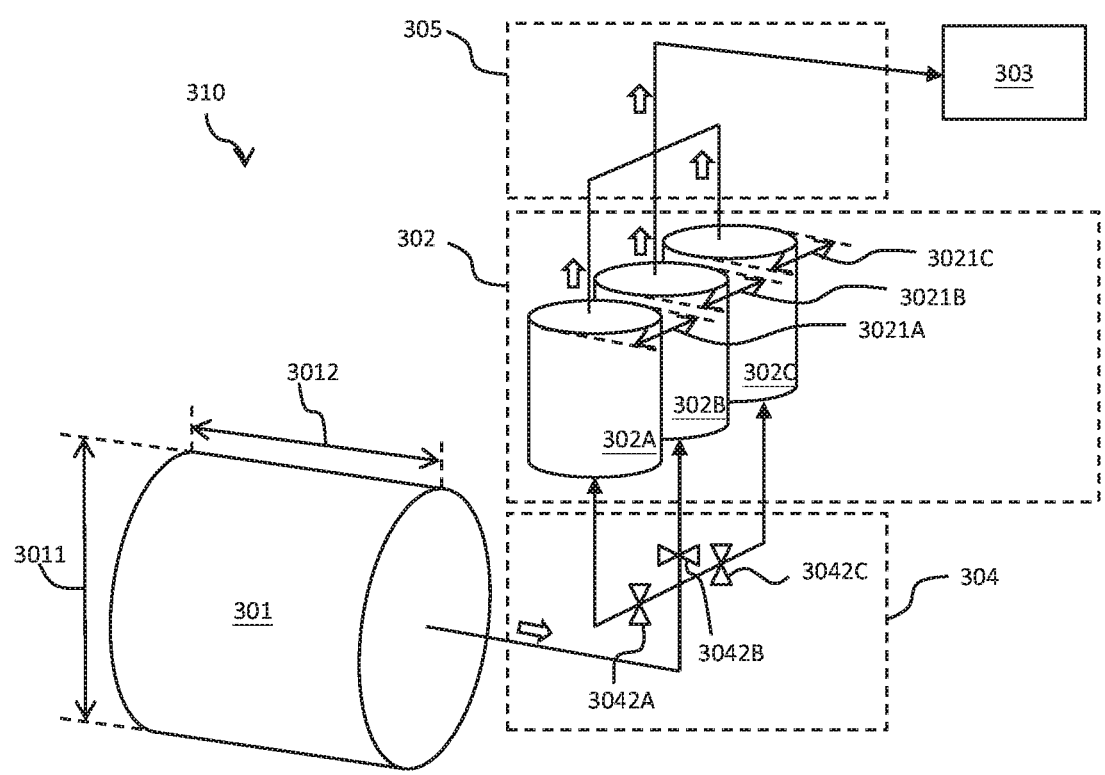
FIG. 3A is a schematic diagram of a thermal cracking system according to one embodiment of the invention.

Reference is now made to FIG. 3A, which is a schematic diagram of a thermal cracking system 310 according to one embodiment of the invention. In this embodiment, thermal cracking system 310 is based on those systems described in conjunction with FIG. 2A and FIG. 2B. As shown in FIG. 3A, in thermal cracking system 310, the catalyst tower 302 is an assembly which comprises at least one sub-catalyst tower, namely 302A, 302B, etc. It should be noted that, in FIG. 3A three sub-catalyst towers are depicted, but as will be appreciated by those skilled in the art, the number of the sub-catalyst tower is not limited to three, other number can be implemented without deviating from the invention concept.

In this embodiment, the design capacity of catalyst tower assembly 302 is equivalent to the sum of that of individual sub-catalyst towers 302A, 302B and 302C. The capacity of individual sub-catalyst towers may be identical or not. Also in this embodiment, the pre-catalyst tower piping 304 refers to the piping network which connects the reactor 301 to the catalyst tower assembly 302, and the post-catalyst tower piping 305 refers the piping network which connects the catalyst tower assembly 302 to the condenser 303. The sub-catalyst towers 302A, 302B and 302C work in parallel: oil gas coming from the reactor 301 is free to enter any of the sub-catalyst towers simultaneously. Then, gas streams from individual sub-catalyst towers join into one single stream in the post-catalyst tower piping 305 and continue to flow towards the condenser 305.

In one example of this embodiment, each of the diameter 3021A of the sub-catalyst tower 302A, 3021B of the sub-catalyst tower 302B, and 3021C of the sub-catalyst tower 302C, is equal to or greater than ⅓ of the diameter 3021 in FIGS. 2A and 2B.

In one example of this embodiment, the diameter of the pre-catalyst tower piping 304 is equal to that of the pre-catalyst tower piping 304 in FIGS. 2A and 2B.

Figure 3B:
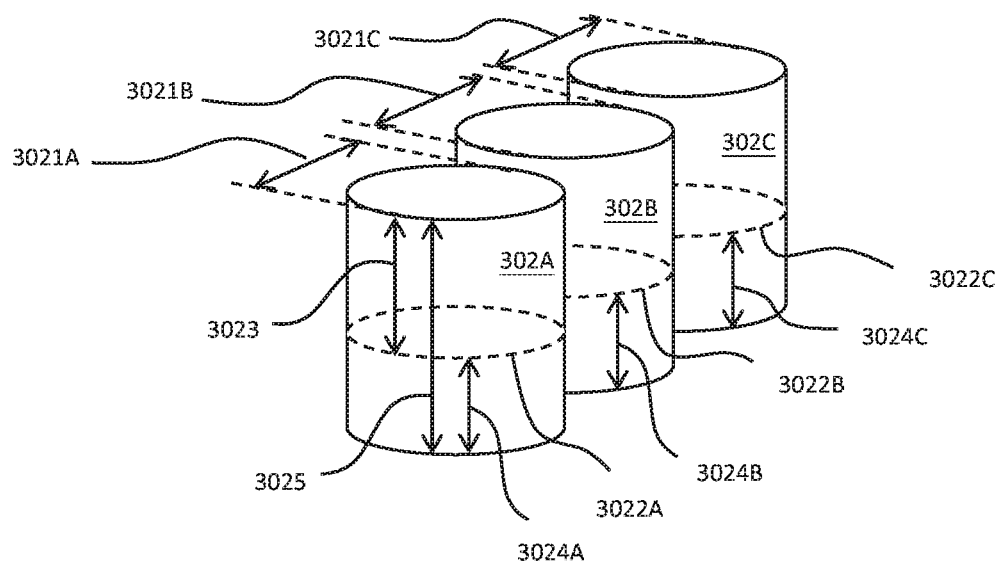
FIG. 3B is a schematic diagram of the sub-catalyst tower assembly of FIG. 3A.

Reference is now made to FIG. 3B, which is a schematic diagram of the catalyst tower assembly 302 in FIG. 3A. Individual sub-catalyst towers 302A, 302B and 302C comprises a catalyst holding plate set therein, namely 3022A, 3022B and 3022C, respectively. As shown in FIG. 3B, in the sub-catalyst tower 302A, the distance between the catalyst holding plate 3022A and the gas inlet (i.e. the connection point of the sub-catalyst tower 302A with the pre-catalyst tower piping 304) is 3024A. Similarly, the distance between the catalyst holding plate 3022B and the gas inlet (i.e. the connection point of the sub-catalyst tower 302B with the pre-catalyst tower piping 304) is 3024B, and the distance between the catalyst holding plate 3022C and the gas inlet (i.e. the connection point of the sub-catalyst tower 302C with the pre-catalyst tower piping 304) is 3024C. In one example of this embodiment, the value of 3024A/3021A, 3024B/3021B and 3024C/3021C is equal or greater than 0.4. More preferably, the value of 3024A/3021A, 3024B/3021B and 3024C/3021C is equal or greater than 0.5. In this embodiment, if the diameter of the pre-catalyst tower piping 304 is selected to be equal to that of the pre-catalyst tower piping 304 in FIGS. 2A and 2B, the optimal value of 3024A/3021A, 3024B/3021B and 3024C/3021C may be less than that of 3024/3021 in FIGS. 2A and 2B, because in such case the difference in diameter of sub-catalyst tower 302A, 302B and 302C with the pre-catalyst tower 304 is smaller as compared to that in FIGS. 2A and 2B.

The thermal cracking system 310 is characterized in that when any of the sub-catalyst tower 302A, 302B and 302C needs to be serviced or have a catalyst change, the system does not need to be shut down completely. As shown in FIG. 3A, the pre-catalyst tower piping 304 may further comprise sub-control valves 3042A, 3042B and 3042C, with each being set on the piping leading to the sub-catalyst tower 302A, 302B and 302C, respectively. When maintenance or a catalyst change is to be performed to the sub-catalyst tower 302A, the sub-control valve 3042A is closed and 3042B and 3042C are opened, such that oil gas only enters the sub-catalyst tower 302B and 302C. As a result, production may continue by employing sub-catalyst towers 302B and 302C when the sub-catalyst tower 302A is being serviced. Similarly, production may continue by employing sub-catalyst towers 302A and 302C when the sub-catalyst tower 302B is being serviced, and may continue by employing sub-catalyst towers 302A and 302B when the sub-catalyst tower 302C is being serviced.

The benefits of the thermal cracking system 310 include cost saving allowed by the light and modular sub-catalyst towers 302A, 302B and 302C. When it is required to increase the overall capacity of the system, additional sub-catalyst towers 302A, 320B and 302C can be added to the original system instead of replacing the single large catalyst tower with a larger one. Similarly, a reduced overall capacity can be rendered by simply shut one or more of the sub-control valves thereby disabling one or more of the sub-catalyst towers.

Figure 3C:
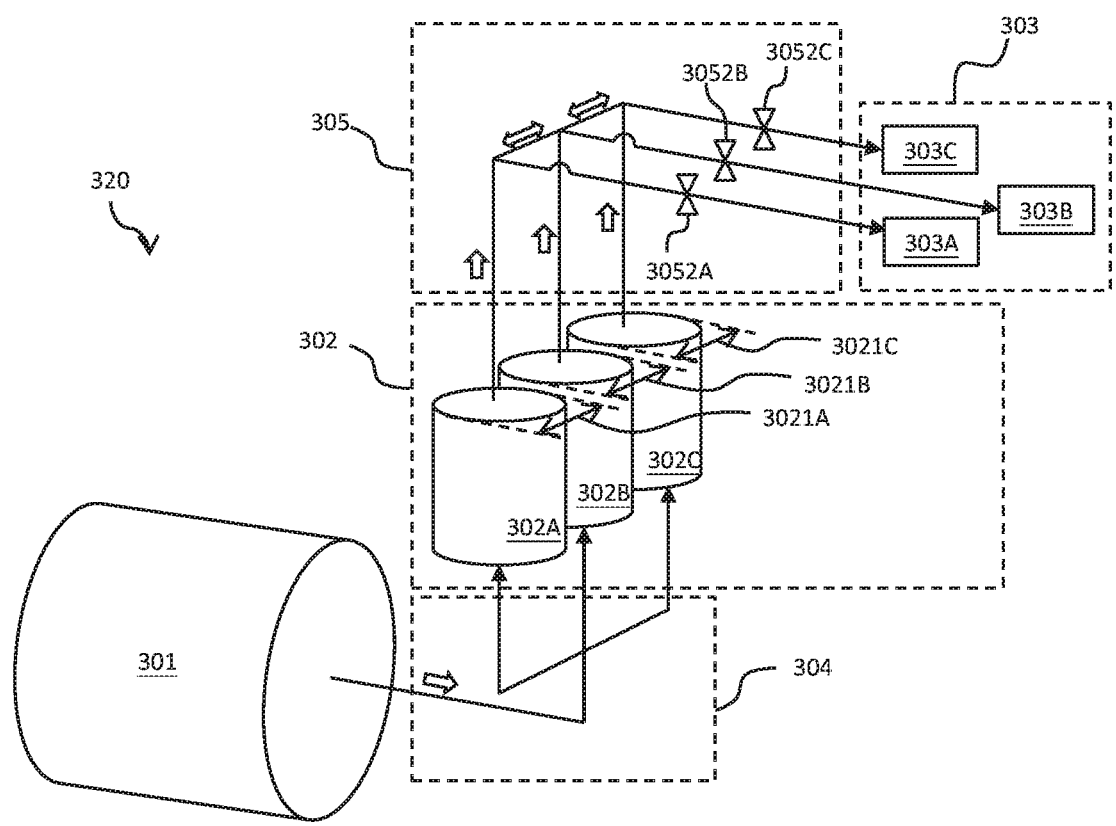
FIG. 3C is a schematic diagram of a thermal cracking system according to another embodiment of the invention.

Reference is now made to FIG. 3C, which is a schematic diagram of a thermal cracking system 320 according to another embodiment of the invention. Thermal cracking system 320 is a variant of thermal cracking system 310 in FIG. 3A. As shown in FIG. 3C, in thermal cracking system 320, the condenser 303 is an assembly which comprises at least one sub-condenser, namely 303A, 303B, etc. It should be noted that, in FIG. 3C three sub-condensers are depicted, but as will be appreciated by those skilled in the art, the number of the sub-condenser is not limited to three, other number can be implemented without deviating from the invention concept. In this embodiment, the design capacity of condenser assembly 303 is equivalent to the sum of that of individual sub-condensers 303A, 303B and 303C. The capacity of individual sub-condensers may be identical or not. In one example of this embodiment, each of sub-condenser has a capacity equal to ⅓ of the design capacity of the condenser assembly 303.

Also in this embodiment, the pre-catalyst tower piping 304 refers to the piping network which connects the reactor 301 to the catalyst tower assembly 302, and the post-catalyst tower piping 305 refers to the piping network which connects the catalyst tower assembly 302 to the condenser assembly 303. As shown in FIG. 3C, in this embodiment, each of the sub-catalyst tower 302A, 302B and 302C is connected to a corresponding sub-condenser 303A, 303B and 303C through the post-catalyst tower piping 305. The white two-way arrows in the post-catalyst tower piping 305 indicate that oil gas is allowed to move freely in both directions in the pipe. In other words, the sub-condensers 303A, 303B and 303C work in parallel. If control valves are set at the location of the white arrows to block gas flow, each of the sub-catalyst tower/sub-condenser pair 302A/303A, 302B/303B, and 302C/303C becomes independent of one another.

The thermal cracking system 320 is characterized in that when any of the sub-condenser 303A, 303B and 303C needs to be serviced, the system does not need to be shut down completely. As shown in FIG. 3C, the post-catalyst tower piping 305 may further comprise sub-control valves 3052A, 3052B and 3052C, with each being set on the piping leading to the sub-condenser 303A, 303B and 303C, respectively. When maintenance is to be performed to the sub-condenser 303A, the sub-control valve 3052A is closed and 3052B and 3052C are opened, such that oil gas only enters the sub-condenser 303B and 303C. As a result, production may continue by employing sub-condensers 303B and 303C when the sub-condenser 303A is being serviced. Similarly, production may continue by employing sub-condensers 303A and 303C when the sub-condenser 303B is being serviced, and may continue by employing sub-condensers 303A and 303B when the sub-condenser 303C is being serviced.

Figure 3D:
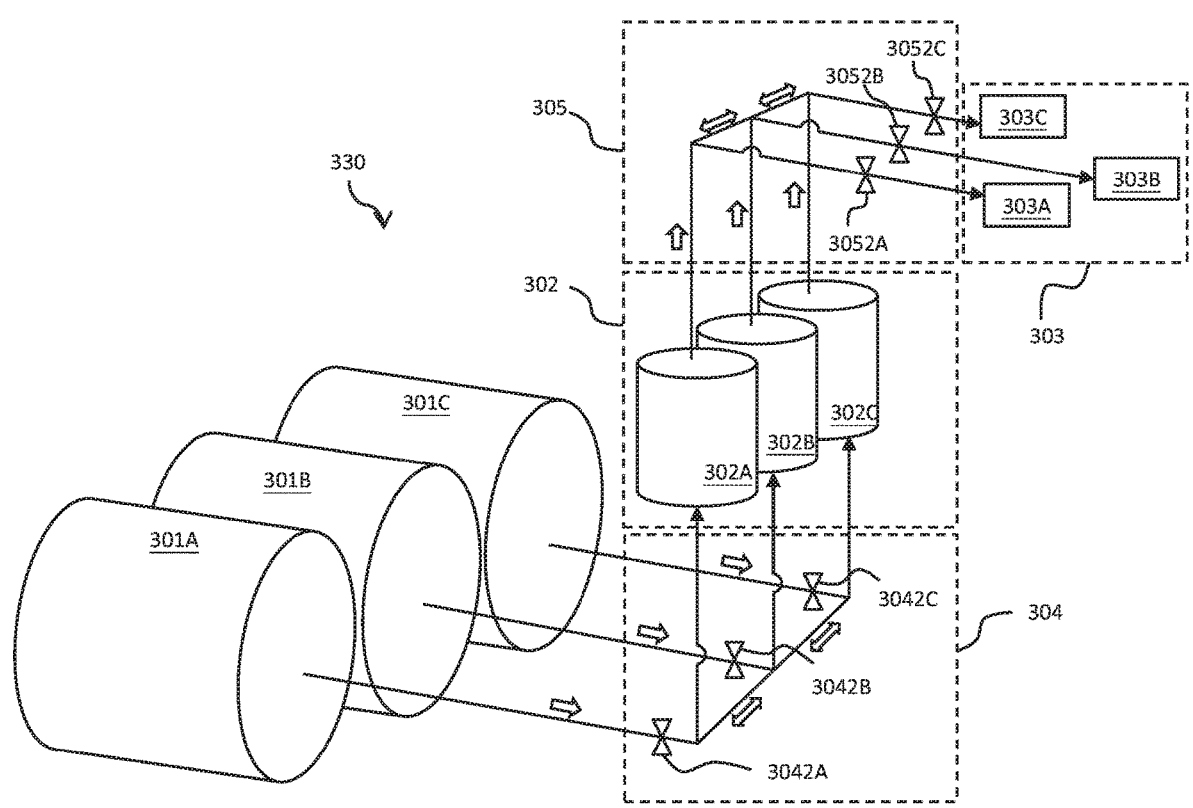
FIG. 3D is a schematic diagram of a thermal cracking system according to yet another embodiment of the invention.

Reference is now made to FIG. 3D, which is a schematic diagram of a thermal cracking system 330 according to yet another embodiment of the invention. Thermal cracking system 330 is a variant of thermal cracking system 320 in FIG. 3C. As shown in FIG. 3D, in thermal cracking system 330, the reactor 301 is an assembly which comprises at least one sub-reactor, namely 301A, 301B, etc. It should be noted that, in FIG. 3D three sub-reactors are depicted, but as will be appreciated by those skilled in the art, the number of the sub-reactor is not limited to three, other number can be implemented without deviating from the invention concept. In this embodiment, the design capacity of reactor assembly 301 is equivalent to the sum of that of individual sub-reactors 301A, 301B and 301C. The capacity of individual sub-reactors may be identical or not. In one example of this embodiment, each sub-reactor has a capacity equal to ⅓ of the design capacity of the reactor assembly 301. Also in this embodiment, the pre-catalyst tower piping 304 refers to the piping network which connects the reactor assembly 301 to the catalyst tower assembly 302, and the post-catalyst tower piping 305 refers to the piping network which connects the catalyst tower assembly 302 to the condenser assembly 303.

The thermal cracking system 330 is characterized in that when each of the sub-reactor 301A, 301B and 301C needs to be serviced, the system does not need to be shut down completely. As shown in FIG. 3D, the pre-catalyst tower piping 304 may further comprise sub-control valves 3042A, 3042B and 3042C, with each being set on the piping leading to the sub-catalyst tower 302A, 302B and 302C, respectively. When maintenance is to be performed to the sub-reactor 301A, the sub-control valve 3042A is closed and 3042B and 3042C are opened, such that oil gas only enters the sub-catalyst tower 302B and 302C. As a result, production may continue by employing sub-reactors 301B and 301C when the sub-reactor 301A is being serviced. Similarly, production may continue by employing sub-reactors 301A and 301C when the sub-reactor 301B is being serviced, and may continue by employing sub-reactors 301A and 301B when the sub-reactor 301C is being serviced.

One of the benefits provided by thermal cracking system 330 is flexibility in use. In FIG. 3D, the white two-way arrows in the pre-catalyst tower piping 304 and post-catalyst tower piping 305 indicate that oil gas is allowed to move freely in both directions in the pipe. In other words, the sub-catalyst tower 302A, 302B and 302C work in parallel, and so do the sub-condensers 303A, 303B and 303C. If control valves 3042A and 3042B are closed, the resulting configuration of thermal cracking system 330 is substantially equivalent to the thermal cracking system 320 described in conjunction with FIG. 3C. If, in addition to control valves 3042A and 3042B, 3052A and 3052B are also closed, the resulting configuration of thermal cracking system 330 is substantially equivalent to the thermal cracking system 310 described in conjunction with FIG. 3A.

The embodiments in FIG. 2 and FIG. 3 can be combined. For example, if the embodiment in FIG. 3A is to be integrated into that in FIG. 3D, then individual sub-catalyst tower 302A, 302B or 30C in thermal cracking system 330 in FIG. 3D would become an assembly which comprises at least one secondary sub-catalyst tower e.g. 302AA, etc.

It should be noted that, although in the embodiments and examples mentioned above the reactor and catalyst tower are described in the shape of cylinders, other shapes may be implemented without deviating from the invention concept. For example, if the reactor and catalyst tower are implemented in the shape of cuboid, then the dimensions of a cuboid that has similar significance to those of cylinder may be used as design parameters. For example, the length of cuboid may be used in place of the length of cylinder, and the face diagonal of cuboid may be used in place of the diameter of cylinder.

While the invention has been described in various embodiments in the above, they are not intended to limit the invention. Any changes and modifications can be made by those skilled in the art without departing from the scope and spirit of the invention. In view of foregoing, it is intended that the scope of the invention is defined by the following claims.

What is claimed is:

1. An apparatus, comprising:
    a tower with an opening, wherein said tower receives a gas stream via said opening;
    a plate for holding a bed of chemicals, wherein said plate is set in said tower, and said bed of chemicals is used for treating said gas stream; and
    a reactor for generating said gas stream from a reactant selected from a group consisting of the following, or combinations thereof: waste plastic, waste tire, and waste oil;
    wherein said tower has a first diameter, said opening has a second diameter, and said first diameter is equal to or greater than 4.5 times of said second diameter.

2. The apparatus according to claim 1, wherein said plate is apart from said opening by a distance, a ratio of said distance to said first diameter of said tower is equal to or greater than 0.4.

3. The apparatus according to claim 1, wherein said bed of chemical provides reformation or purification to said gas stream.

4. The apparatus according to claim 1, wherein a capacity ratio of said tower to said reactor is between ¹⁄₁₅ and ⅛.

5. The apparatus according to claim 4, wherein said reactor is a rotary reactor.

6. The apparatus according to claim 1, wherein a diameter ratio of said tower to said reactor is between ⅓ and 1.

7. The apparatus according to claim 6, wherein said reactor is a rotary reactor.

8. A method for thermal cracking a feed material selected from a group consisting of the following or combinations thereof: waste plastic, waste tire, and waste oil, comprising:
    subjecting said feed material to a thermal cracking reaction thereby generating a gas stream; and
    sending said gas stream to a first tower, wherein said first tower includes an opening for receiving said gas stream and a bed of chemicals therein for treating said gas stream, said first tower has a first diameter, said opening has a second diameter, and said first diameter is equal to or greater than 4.5 times of said second diameter.

9. The method according to claim 8, wherein said bed of chemicals is apart from said opening by a distance, a ratio of said distance to said first diameter of said first tower is equal to or greater than 0.4.

10. The method according to claim 8, wherein said thermal cracking reaction occurs in a reactor, and a capacity ratio of said first tower to said reactor is between ¹⁄₁₅ and ⅛.

11. The method according to claim 8, wherein said thermal cracking reaction occurs in a reactor, and a diameter ratio of said first tower to said reactor is between ⅓ and 1.

12. The method according to claim 8, wherein said bed of chemicals provides reformation or purification to said gas stream.

13. The method according to claim 8, further comprising:
    sending said gas stream to a second tower; and
    condensing said gas stream.

14. The method according to claim 13, further comprising:
    providing a plurality of sub-control valves for regulating said gas stream to said first tower and said second tower.

15. The method according to claim 8, wherein said thermal cracking reaction occurs in a first reactor and a second reactor.

16. The method according to claim 15, further comprising:
   providing a plurality of sub-control valves for controlling distributing said feed material to said first reactor and said second reactor.

\* \* \* \* \*